United States Patent [19]

Hiramatsu et al.

[11] 4,052,930
[45] Oct. 11, 1977

[54] ELECTRIC AND HYDRAULIC SERVOMECHANISM CONTROLLING DEVICE

[75] Inventors: Takeo Hiramatsu, Kyoto; Yasuhiko Fujita, Moriyama, both of Japan

[73] Assignee: Mitsubishi Jidosha Kogyo Kabushiki Kaisha, Japan

[21] Appl. No.: 577,765

[22] Filed: May 15, 1975

[30] Foreign Application Priority Data

May 16, 1974 Japan .................. 49-54850

[51] Int. Cl.² .................. F15B 11/08; F15B 13/043
[52] U.S. Cl. .................. 91/446; 74/869; 91/448; 91/451; 91/459; 91/461; 137/596.12; 137/625.64
[58] Field of Search .................. 91/446, 448, 459, 468, 91/451, 461, 304; 137/596.12, 596.16, 625.64; 74/869

[56] References Cited

U.S. PATENT DOCUMENTS

| 2,775,254 | 12/1956 | Stanbury | 91/459 X |
| 3,455,210 | 7/1969 | Allen | 91/446 |
| 3,621,735 | 11/1971 | Lemieux | 74/869 X |
| 3,646,851 | 3/1972 | Mohri | 91/459 |
| 3,727,487 | 4/1973 | Forster et al. | 137/625.64 X |
| 3,771,424 | 11/1973 | Allen et al. | 91/448 X |
| 3,856,047 | 12/1974 | Takayama | 137/625.64 X |

Primary Examiner—Irwin C. Cohen
Attorney, Agent, or Firm—Robert E. Burns; Emmanuel J. Lobato; Bruce L. Adams

[57] ABSTRACT

An electric and hydraulic servomechanism controlling device comprises a pressure governor valve, a hydraulic servomechanism actuated by the supply of the line pressure regulated by said pressure governor valve, and a change-over valve for shifting an oil passage that connects said pressure governor valve and hydraulic servomechanism. The change-over valve serves also as a pressure reducing valve thereby reducing not only the capacity but also the size of the necessary solenoid.

2 Claims, 3 Drawing Figures

ELECTRIC AND HYDRAULIC SERVOMECHANISM CONTROLLING DEVICE

DETAILED DESCRIPTION OF THE INVENTION

The present invention relates to an electric and hydraulic servomechanism controlling device for use in controlling the overdrive mechanism of an automobile and the like.

Conventionally two techniques have been known for electrically controlling a change-over valve for shifting the level of hydraulic pressure in a hydraulic servomechanism; that is, (1) the technique of fitting a solenoid directly to the change-over valve, and (2) the technique of employing a solenoid valve for regulating the change-over valve controlling hydraulic pressure.

However, the technique (1) necessitates, because of the nature of the change-over valve, increasing the amount of the movement of a change-over valve rod to a considerably great extent, which, in turn, requires a large solenoid with a large capacity.

On the other hand, the technique (2) employs a high pressure discharged from a pressure governor valve as the hydraulic pressure for controlling the change-over valve. This necessitates such a great force to close an orifice before the solenoid valve that a large solenoid having a large capacity has heretofore been used. If a small solenoid is used, an additional reducing valve must be provided.

An object of this invention is to provide an electric and hydraulic servomechanism controlling device which comprises a change-over valve that serves also as a pressure reducing valve, thereby reducing not only the capacity but also the size of the solenoid.

To attain such an object, the electric and hydraulic servomechanism controlling device according to this invention consists of a hydraulic pressure source, a pressure governor valve regulating the line pressure that is pressurized by said hydraulic pressure source, a hydraulic servomechanism actuated by the supply of the line pressure regulated by said pressure governor valve, a change-over valve for shifting an oil passage that connects said pressure governor valve and hydraulic servomechanism, a solenoid valve, a signal transmitting device for transmitting electric signals to the solenoid valve, and an oil passage A connecting said change-over and solenoid valves and supplied with oil under said line pressure through said change-over valve. The pressure governor valve is so composed, controlled by hydraulic pressure in said oil passage A, as to raise the line pressure when the hydraulic pressure rises. Also controlled by the same hydraulic pressure in the oil passage A, the change-over valve is so made as to be put in a first position, when the hydraulic pressure in said oil passage A is relatively high, where the line pressure generated at the hydraulic pressure source is supplied to the hydraulic servomechanism and, at the same time, the hydraulic pressure in the oil passage A is adjusted to a certain pressure level than said line pressure, and in a second position, when the hydraulic pressure in the oil passage A is low, where the oil in the hydraulic servomechanism is discharged and the hydraulic pressure in the oil passage A is made the line pressure. When said solenoid valve does not operate under the control of said signal transmitting device, oil in said oil passage A is discharged to lower the hydraulic pressure applied on said pressure governor valve, whereby the line pressure is sufficiently lowered and said change-over valve is placed in the second position. When the solenoid valve operates, discharge of oil from the oil passage A is stopped to raise the pressure applied to the pressure governor valve, thereby making the line pressure higher than the hydraulic pressure in the oil passage A when the change-over valve is in the second position so that the change-over valve is shifted to the first position.

As one embodiment of the present invention, an electric and hydraulic servomechanism controlling device in the automobile overdrive mechanism will now be described with reference to the accompanying drawings, in which.

Figure 1:
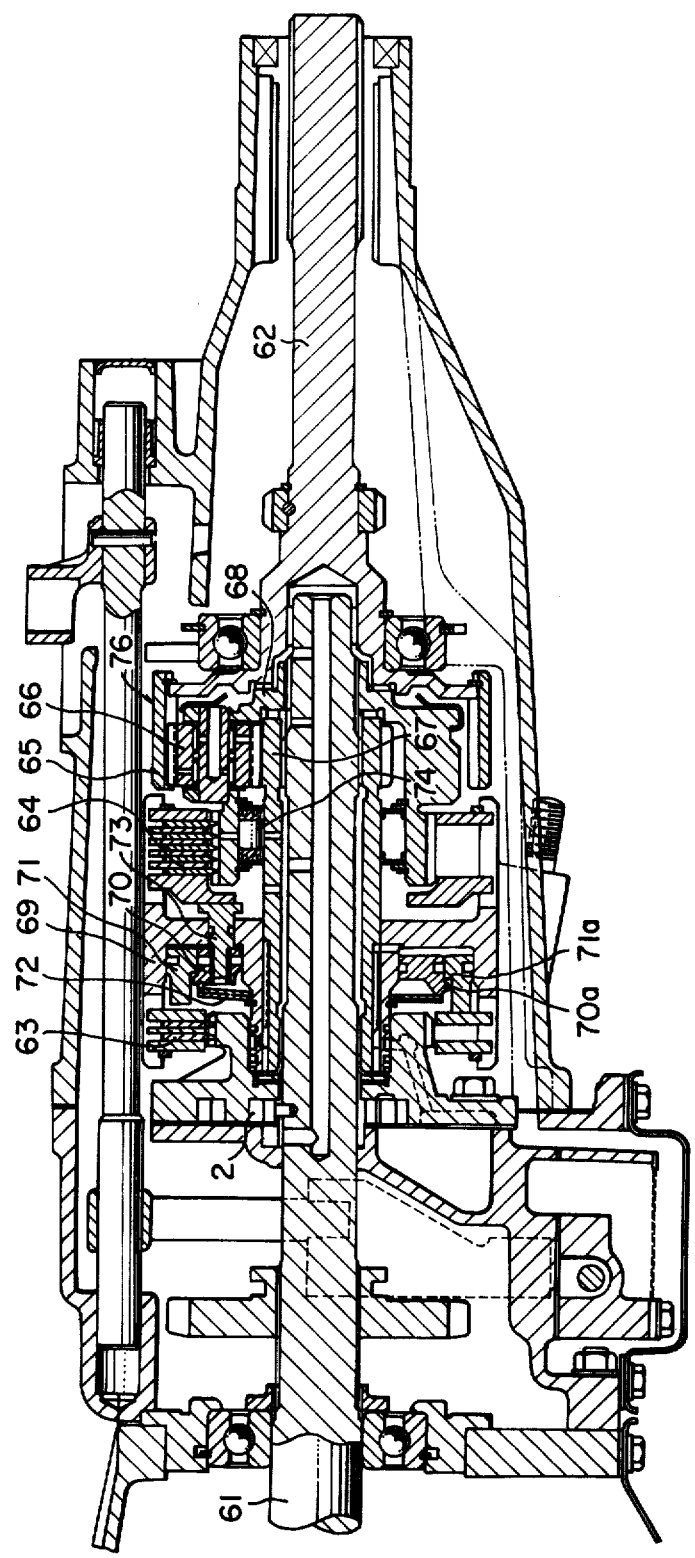
FIG. 1 is a longitudinal cross section of said overdrive mechanism.

As illustrated in FIG. 1, this overdrive mechanism is switchably controlled between direct drive where an input shaft 61 driven by an engine (not shown) and an output shaft 62 for driving the automobile wheels rotate at the same speed, and overdrive where the output shaft 62 rotates at a greater speed than the input shaft 61.

This mechanism has a planetary gear mechanism 76 disposed between the input shaft 61 and the output shaft 62, the planetary gear mechanism consisting of a ring gear 65, a pinion 66, a sun gear 67 and a carrier 68 which rotatably supports the pinion 66. When a friction clutch 64, which is a first friction element, engages as described later, the input shaft 61 and the output shaft 62 are integrally connected to create a direct drive state. When, on the other hand, this friction clutch 64 disengages and a friction brake 63, which is a second friction element, engages, relative rotation of the pinion 66 and the sun gear 67 takes place in the planetary gear mechanism 76, thereby creating an overdrive state in which the output shaft 62 rotates faster than the input shaft 61. Also, a one-way clutch 74 is provided between the carrier 68 and the sun gear 67, so that the sun gear 67 rotates in the same direction as the input shaft 61, but not faster than the carrier 68.

If the number of teeth of the sun gear is Zs and that of the ring gear 65 is Zr, the overdrive ratio $\phi$ is expressed as:

$$\phi = \frac{Zr}{Zs + Zr}$$

The following table depicts the operating conditions of the two friction elements and the one-way clutch 74 under each drive condition.

|  | Friction Brake 63 | Friction Clutch 64 | One-way Clutch 74 |
|---|---|---|---|
| Direct Drive |  | * | (*) |
| Overdrive | * |  |  |

*Operating
(*)Operating when engine is driven

Now the contruction of this overdrive mechanism will be described in further detail. An inner piston 70, a first piston, and an outer piston 71, a second piston, are arranged in a row within a common hydraulic cylinder 69. Also, a cone-shaped spring 72 is provided to produce sufficient force to engage the friction clutch 64 by way of a push rod 73.

In the planetary gear mechanism 76, the carrier 68 is connected to and integrally rotates with the input shaft 61, the sun gear 67 with the cylinder 69, and the ring gear 65 with the output shaft 62.

In the case of direct drive, the friction clutch 64 is engaged by the force of the spring 72, whereby the planetary gear mechanism 76 rotates integrally.

When shifting to overdrive, hydraulic pressure is supplied from an oil pump 2 to the cylinder 69, whereupon the inner piston 70 produces a force to oppose that of the spring 72, and the inner piston 70 and the outer piston 71 integrally move in a direction in which the hydraulic pressure works. At this time, the push rod 73, connected to the inner piston 70, moves integrally therewith, and, as a consequence, the friction clutch 64 becomes disengaged therefrom.

Because the friction brake 63 is disposed in the path of travel in which the inner piston 70 and outer piston 71 move, the outer piston 71 actuates the friction brake 63 by the hydraulic pressure working on its pressure receiving surface when the friction clutch 64 has been completely disengaged.

In keeping with this, the sun gear 67 gradually slows down its rotating speed until finally it comes to a halt, whereupon the pinion 66 revolves round the sun gear 67 to create an overdrive state. The one-way clutch 74 not only receives the torque of direct drive, but also is conducive to obtaining smooth transmission by preventing overturning of the prime mover when shifting from direct drive to overdrive.

When shifting from overdrive to direct drive, oil in the hydraulic servomechanism is discharged, whereupon the inner piston 70 is pushed back by the force of the spring 72. Then, a pawl 70a of the inner piston 70 engages with a pawl 71a of the outer piston 71, by which means the outer piston 71 too is pushed back to disengage the friction brake 63. As the inner piston 70 moves further, the friction clutch 64 starts to engage and the relative rotating speed of the sun gear 67 and the carrier 68 becomes progressively smaller until finally it becomes zero when a direct drive state is obtained.

Figure 2:
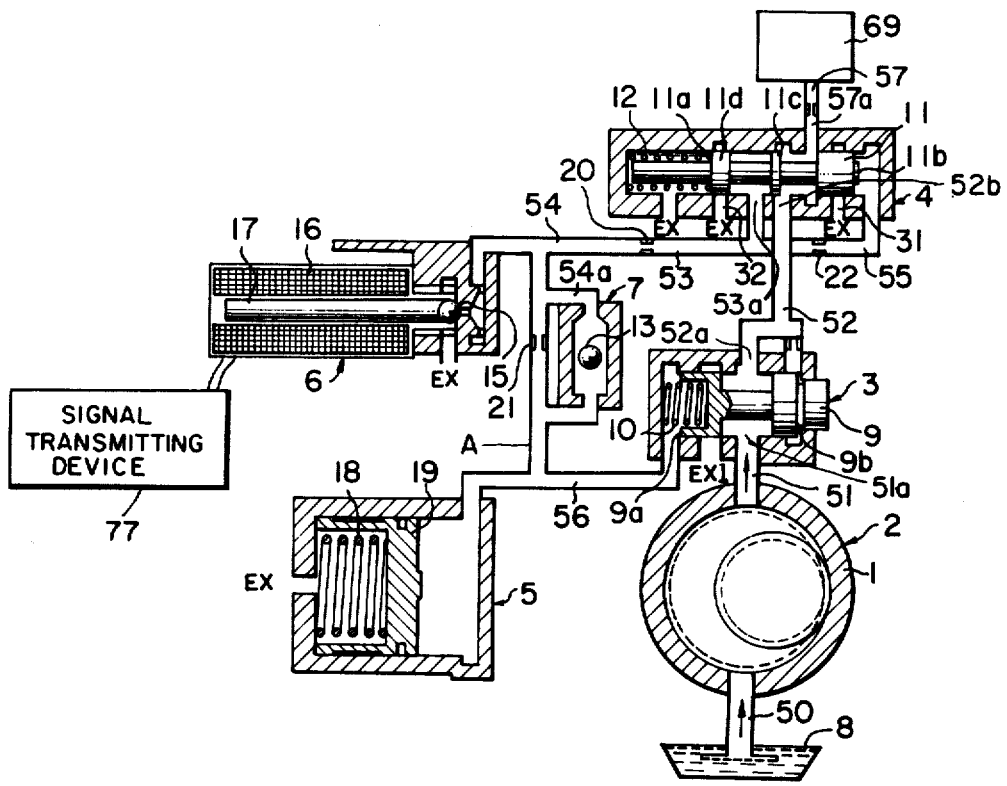
FIG. 2 is a hydraulic pressure circuit diagram of its electric and hydraulic servomechanism controlling device.

FIG. 2 is a circuit diagram illustrating a hydraulic controlling device of the overdrive mechanism shown in FIG. 1, in which oil is supplied by a pump 2 driven by the input shaft 61 (see FIG. 1) from an oil reservoir 8 to an inlet port 51a of a pressure governor valve 3, through circuits 50 and 51 in case 1.

The pressure governor valve 3 regulates the hydraulic pressure supplied to the other controlling elements by means of a spring 10 and hydraulic pressure working on a pressure-receiving end surface 9a on a pressure-receiving surface 9b provided at the left and right end portions of a valve rod 9. The oil whose pressure is thus regulated is fed through a controlled flow outlet port 52a to an inlet port 32b of a transmitting or change-over valve 4 through a circuit 52.

A coil 16 of a solenoid valve 6 is energized and denergized in response to electrical signals supplied by a signal transmitting device 77 which develops signals depending on such conditions as the running speed of the automobile, the throttle opening, and the boost negative pressure. The overdrive mechanism assumes an overdrive state when the solenoid is "on", and a direction drive state when the solenoid is "off".

When the solenoid is "off", a valve rod 17 opens an orifice 15, whereupon oil in circuits 53, 54, 55 and 56 and in the passage A is released through orifices 20, 21, 22 and 15, respectively.

Then, the force of a spring 12 working on a pressure-receiving end surface 11a of the change-over valve 4 becomes greater than the hydraulic pressure working on a end pressure-receiving surface 11b of a valve rod 11. As a consequence, the circuits 52 and 53 communicate with each other, and oil from the oil pump 2 is discharged from the orifice 15.

A circuit 57 leading to a cylinder 69 and the oil supply circuit 52 are disconnected by a valve land 11c, while the cylinder 69 communicates with an exhaust port 31 and hydraulic pressure in the cylinder 69 is zero. At this time, hydraulic pressure in the circuits 51 and 52 is low, because hydraulic pressure in the circuit 56 is zero and, therefore, the left end surface of the pressure governor valve 3 receives only the force of the spring 10. This decreases power loss due to the driving of the pump 2.

When the solenoid is shifted from "off" to "on", the valve rod 17 closes the orifice 15. Because of this, the flow of oil from the orifice 15 stops, thereby raising hydraulic pressure in the circuits 53, 54, 55 and 56 and in the passage A. At this time, the valve rod 11 in the transmitting or change-over valve 4 moves to the left until the hydraulic pressure working on its right end surface 11b becomes balanced with the force of the spring 12 that pushes said rod in the opposite direction.

That is, the valve rod 11 stops when the land 11c comes between the circuits 52 and 53, and a valve land 11d between the circuit 53 and an exhaust portion 32, thereby regulating hydraulic pressure in the circuits 53, 54, 55 and 56 and in the passage A to a level corresponding to the force of the spring 12.

Figure 3:
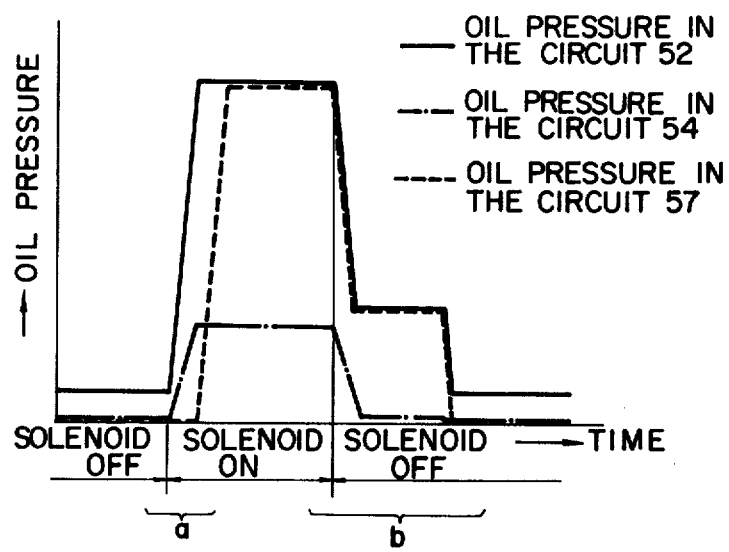
FIG. 3 is a graph representing the hydraulic characteristics of this invention.

Since the hydraulic pressure thus regulated works on the left end or pressure-receiving surface 9a of the pressure governor valve 3, passing through the circuit 56, hydraulic pressure in the circuit 52 becomes sufficiently great with respect to the torque received by the friction brake 63, and is supplied to the cylinder 69 through outlet port 57a of the change-over valve 4 and through a circuit 57 that is connected as a result of the movement of the valve rod 11, thereby establishing an overdrive state. The relationship between the hydraulic pressure in the circuits 52, 54 and 57 and time under such condition is shown in portion (a) of FIG. 3.

On the other hand, when the solenoid is "on", a piston 19 is moved leftward by the hydraulic pressure in the circuit 56 that surpasses the force of a spring 18, and an accumulator 5 is filled with oil.

When the solenoid shifts from "on" to "off", the valve rod 17 moves to the left, and the orifice 15 becomes opened. Then, hydraulic pressure in the circuit 56 drops to a level that corresponds to the force of the spring 18 and the cross sectional area of the piston 19 in the accumulator 5. Hydraulic pressure in the circuit 52 also is reduced by the pressure governor valve 3. Following this, the piston 19 starts to move to the right, and a ball 13 in a check valve 7, moved by the flow of oil, disconnects a circuit 54a and the circuit 56. Therefore, oil in the accumulator 5 is discharged little by little through the circuit 56, orifice 21, circuit 54 and orifice 15.

Until the oil in the accumulator 5 has been completely discharged, hydraulic pressure in the circuit 56 is maintained almost constant and continues to work on the left end surface 9a of the valve rod 9. Consequently, hydraulic pressure in the circuit 52 remains lower than that which occurs when the solenoid is "on".

Because hydraulic pressure in the circuit 52 at this time is higher than one regulated by said change-over valve 4, the valve 4 is still in a regulating condition, and the circuits 52 and 57 remain communicated with each other.

As a consequence, hydraulic pressure in the cylinder 69 falls from a high level, which is established when the solenoid is "on", to a low level for a certain period of time, in keeping with the motion of the piston 19 of the accumulator 5. For a certain period of time after the solenoid has been shifted to "off" by such hydraulic operation, a low hydraulic pressure is applied against the spring 72, by way of the inner piston 70 and the outer piston 71, so that the force of the spring 72 does not altogether work on the friction clutch 64. By this means, transmission from overdrive to direct drive, while the engine brake is in operation, can be accomplished smoothly.

When the oil in the accumulator 5 has been completely discharged, hydraulic pressure in the circuit 56 becomes zero, and hydraulic pressure in the circuits 52, 53 and 55 also drops as described previously. Therefore, the valve rod 11 is moved to the right by the force of the spring 12, oil in the cylinder 69 is completely discharged from the exhaust port 31, and the force of the spring 72 works on the friction clutch 64, thereby preventing the slip of the friction clutch 64 during direct drive. The relationship between the hydraulic pressure in the circuits 52, 54 and 57 and time under such conditions are shown in portion (b) of FIG. 3.

As described above, the change-over valve 4 functions also as a pressure reducing valve in the electric and hydraulic servomechanism controlling device according to this invention. This offers an advantage that the size and capacity of the solenoid valve 6 may be reduced to a considerable degree.

Finally, this invention is applicable not only to the above-described overdrive mechanism of automobiles, but also, of course, to the control of hydraulic pressure supplied to the other types of hydraulic servomechanisms.

What is claimed is:

1. An electric and hydraulic servomechanism control device comprising: a hydraulic pressure source for supplying pressurized oil and including a pump (2) and an oil reservoir (8); a hydraulic servomechanism actuated by hydraulic pressure; a pressure governor valve (3) having an inlet portion (51a) connected to the output side of said pump, a first controlled flow outlet port (52a), an excess flow outlet portion EX1 for returning the oil to said oil reservoir (8), a first slidable valve rod 9 with lands thereon disposed for opening and closing said outlet port, (EX1) for controlling the fluid flow from said inlet port (51a) to each of said outlet port (52a, EX1) and having two pressure-receiving surfaces (9a, 9b) one (9b) of which is defined by an annular portion of said first valve rod and responds to the hydraulic pressure in said first controlled flow outlet port (52a) for urging said first slidable valve rod (9) in one direction and the other (9a) of which responds to hydraulic pressure for urging said first slidable valve rod (9) in the other direction, and first means (10) for pressing said first slidable valve rod (9) in said other direction; a change-over and pressure-reducing valve 4 having an inlet port (52b) connected to said first controlled flow outlet port (52a), an outlet port (57a) connected to said hydraulic servomechanism, two exhaust ports (31, 32) for returning the oil to said oil reservoir (8), a second controlled flow outlet port (53a), a second slidable valve rod (11) with multiple lands thereon slidably disposed for selectively changing the flow direction from said inlet port (52b) to said outlet port (57a) or said second controlled flow outlet port (53a) and having a pressure-receiving surface 11b which responds to the hydraulic pressure in said second controlled flow outlet port (53a) for urging said second slidable valve rod (11) in one direction, and second means (12) for pressing said second slidable valve rod (11) in the other direction which is opposite to the direction in which the hydraulic pressure fed from said second controlled flow outlet port (53a) is applied thereto; a signal transmitting device (77) for transmitting electrical signals; a solenoid valve (6) having an orifice (15) connected to said oil reservoir (8) and which is opened and closed according to said electrical signals applied thereto from said signal transmitting device (77); and a hydraulic passage A interconnecting a hydraulic pressure supplying passage (56) leading to said hydraulic pressure-receiving surface 9a with said orifice (15) of said solenoid valve (6) and with said second controlled flow outlet port (53a); whereby when said solenoid valve (6) closes said orifice (15) and the hydraulic pressure in said hydraulic passage A rises, said second slidable valve rod (11) of said change-over valve (4) slides to a first position where the force applied on said second slidable valve rod (11) by the hydraulic pressure of said second controlled flow outlet port (53a) balances with the force applied by said second means (12) thereby communicating said inlet port (52b) and said outlet port (57a) connected to said hydraulic servomechanism and controlling the hydraulic pressure in the hydraulic passage A to a given level lower than the hydraulic pressure in said first controlled flow outlet port (52a) by discharging the excess oil in said hydraulic passage A through one 32 of said two exhaust ports of said change-over valve (4), said pressure governor valve (3) raises the hydraulic pressure in said first controlled flow outlet port (52a) when the hydraulic pressure in said hydraulic passage (A) rises, and said second slidable valve rod (11) slides to a second position when said solenoid valve (6) opens said orifice (15) to permit the oil to flow out of said hydraulic passage (A) to lower the hydraulic pressure therein thereby disconnecting said inlet port (52b) from said outlet port (57a) to effect discharge of the oil from said hydraulic servomechanism through one (31) of said two exhaust ports of said change-over valve (4) thereby communicating said inlet port (52b) with said second controlled flow outlet port (53a).

2. An electric and hydraulic servomechanism control device according to claim 1; further including an accumulator (5) connected in said hydraulic passage (A) between said solenoid valve orifice (15) and said hydraulic pressure supplying passage (56), and an orifice (21) and a check valve (7) interposed, in parallel, between said accumulator (5) and said solenoid valve orifice (15).

* * * * *